United States Patent [19]
Ochiai et al.

[11] Patent Number: 4,989,021

[45] Date of Patent: Jan. 29, 1991

[54] CLEANING DEVICE FOR CONDUCTIVE MAGNETIC TONER AND IMAGE RECORDING APPARATUS USING SAME

[75] Inventors: Toshihiko Ochiai, Tokyo; Yujiro Ando, Yokohama, both of Japan

[73] Assignee: Canon Kabushiki Kaisha, Tokyo, Japan

[21] Appl. No.: 270,063

[22] Filed: Nov. 14, 1988

[30] Foreign Application Priority Data

Nov. 17, 1987 [JP] Japan ............................... 62-288428

[51] Int. Cl.[5] ............................................ G01D 15/00

[52] U.S. Cl. .................................. 346/160.1; 355/305

[58] Field of Search .................. 346/160.1, 150, 153.1; 355/297, 299, 305, 302, 303

[56] References Cited

U.S. PATENT DOCUMENTS

| | | | |
|---|---|---|---|
| 3,914,771 | 10/1975 | Lunde et al. | 346/74 ES |
| 4,451,139 | 5/1984 | Yanagawa et al. | 355/303 |
| 4,547,787 | 10/1985 | Kaneko et al. | 346/160 |
| 4,739,348 | 4/1988 | Ando et al. | 364/160.1 |
| 4,788,564 | 11/1988 | Ochiai | 346/160.1 |

FOREIGN PATENT DOCUMENTS

| | | | |
|---|---|---|---|
| 53-95641 | 8/1978 | Japan | 346/160.1 |
| 54-87232 | 11/1979 | Japan | 346/160.1 |
| 58-76875 | 5/1983 | Japan | 346/160.1 |
| 62-239184 | 10/1987 | Japan | 346/160.1 |
| 63-18384 | 1/1988 | Japan | 346/160.1 |
| 2129372A | 11/1982 | United Kingdom | 346/303 |

OTHER PUBLICATIONS

C. Whited & J. Lang, Xerox Disclosure Journal, Brush for Charging Detack, Cleaning and/or Transfer, vol. 8, No. 1, (Jan./Feb. 1983).

*Primary Examiner*—Arthur G. Evans
*Attorney, Agent, or Firm*—Fitzpatrick, Cella, Harper & Scinto

[57] ABSTRACT

The cleaning device for removing the toner image formed by conductive and magnetic toner from the recording medium. The cleaning device includes a rubbing member made of an electrically conductive brush of soft material or a conductive resin blade made of soft material to clean the recording medium. The cleaning device is disposed upstream of the recording position. Damage of the recording material by cleaning is prevented according to the present invention.

11 Claims, 5 Drawing Sheets

CLEANING DEVICE FOR CONDUCTIVE MAGNETIC TONER AND IMAGE RECORDING APPARATUS USING SAME

FIELD OF THE INVENTION AND RELATED ART

The present invention relates to a cleaning device usable with an image recording apparatus, particularly, a recording apparatus wherein a voltage is applied between recording electrodes and a recording medium having a toner bearing surface to imagewisely deposit a magnetic developer such as toner to the recording medium by an electrostatic force, and to an image recording apparatus such as a printer and display using the cleaning device.

Japanese Laid-Open Patent Application No. 18384/1987 (U.S. Pat. No. 4,788,564) discloses an apparatus of this type, as shown in FIG. 8 of this application. In this type of the apparatus, a recording medium 100 in the form of an endless belt is supported on rotatable supporting members 101 and 102 to form a display surface, and wherein the supporting members 101 and 102 are rotated to display an image formed by said image forming means 103 on the recording medium 100 at a display station.

The image forming means 103 is as disclosed in Japanese Patent Application Publication 46707/1976 (U.S. Pat. No. 3,914,771). More particularly, a voltage is applied between the recording electrode 105 and the recording medium 100 in accordance with image information supplied by input means 104 such as a keyboard, by which the conductive and magnetic toner particles T supplied to the recording electrode 105 are electrostatically deposited on the recording medium 100 to form a desired image.

In the conventional apparatus, the image formed through the above process is displayed at the display station 106, and thereafter, is erased by a cleaning means 107. The cleaning means 107 comprises a non-magnetic conductive plate 108 which is grounded or supplied with a predetermined voltage and a permanent magnet 109 fixed on the conductive plate 108 in an array. By the magnetic force of the permanent magnet 109, chains of the magnetic toner particles T, that is, a so-called a magnetic brush is formed between the conductive plate 108 and the recording medium 100. Therefore, the magnetic toner particles T electrostatically deposited on the recording material 100 are electrically neutralized by the rubbing contact of the moving recording medium 100 with the magnetic brush, and are mechanically and magnetically released, by which the image is erased on the recording medium 100. The magnetic toner particles T fall by gravity and are collected by the image forming means 103, and thereafter, they are used for the next image formation.

However, in such a conventional example, the magnetic brush of the magnetic toner formed between the recording medium 100 and the conductive plate 108 fall together with the movement of the recording medium 100. Therefore, when a whitish image in which a white part (the part to which no or very small amount of toner particles are deposited) continues in one image area, is recorded to be displayed, or when the whitish images are continuously displayed, the amount of the, magnetic toner T supplied to the cleaning means 107 decreases with the result that the amount of the toner retained by the magnetic force of the permanent magnet 109 decreases. This reduces the height of the magnetic brush, so that less parts of the brush are contacted to the recording medium 100. Therefore, there is a problem that the image is not sufficiently erased after whitish images are continuously displayed.

In an attempt to solve the problem, it is considered that a hard cleaning member such as a resin blade or the like which has been used in the field of electrophotography is press-contacted to the recording medium 100 to scrape the magnetic toner T off the recording medium 100. However, there is a liability that the recording medium 100 is damaged by the scraping contact between the hard cleaning member and the whitish image area of the recording medium 100. In addition, the friction therebetween can produce an electric charge, together with the charge of the magnetic toner T applied during the image recording, the recording medium 100 surface is electrically charged to a positive or negative polarity depending on the material of the recording medium.

When the image recording is carried out using such a charged recording medium 100, the magnetic toner T or the like is deposited onto the recording medium 100, and particularly if the recording medium 100 is negatively charged, the magnetic toner T is deposited on the non-image area, as shown in FIG. 9, when it passes through the image forming means 103, with the result that the image is deteriorated.

SUMMARY OF THE INVENTION

Accordingly, it is a principal object of the present invention to provide a cleaning device which can erase at all times with certainty and without damaging the recording medium even after whitish images are displayed, and an image recording apparatus using the cleaning device.

It is another object of the present invention to provide a cleaning device with which the recording medium is prevented from being charged during image forming operation to prevent the magnetic toner from being deposited, thus providing a high quality image, and an image recording apparatus using the cleaning device.

According to an embodiment of the present invention, there is provided a cleaning device for cleaning a recording medium after the toner is deposited on the recording medium by application of a voltage between the recording electrode and the recording medium with magnetic and conductive toner supplied into the space between the recording electrode and the recording medium, wherein the recording medium is rubbed by conductive and soft fiber or resin to remove the toner from the recording medium.

In the cleaning apparatus, the toner can be removed from the recording medium without damage thereto, and a stabilized cleaning effect can be provided independently of the amount of the toner, and therefore, the cleaning device is applicable to a display apparatus or the like using such a recording medium.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
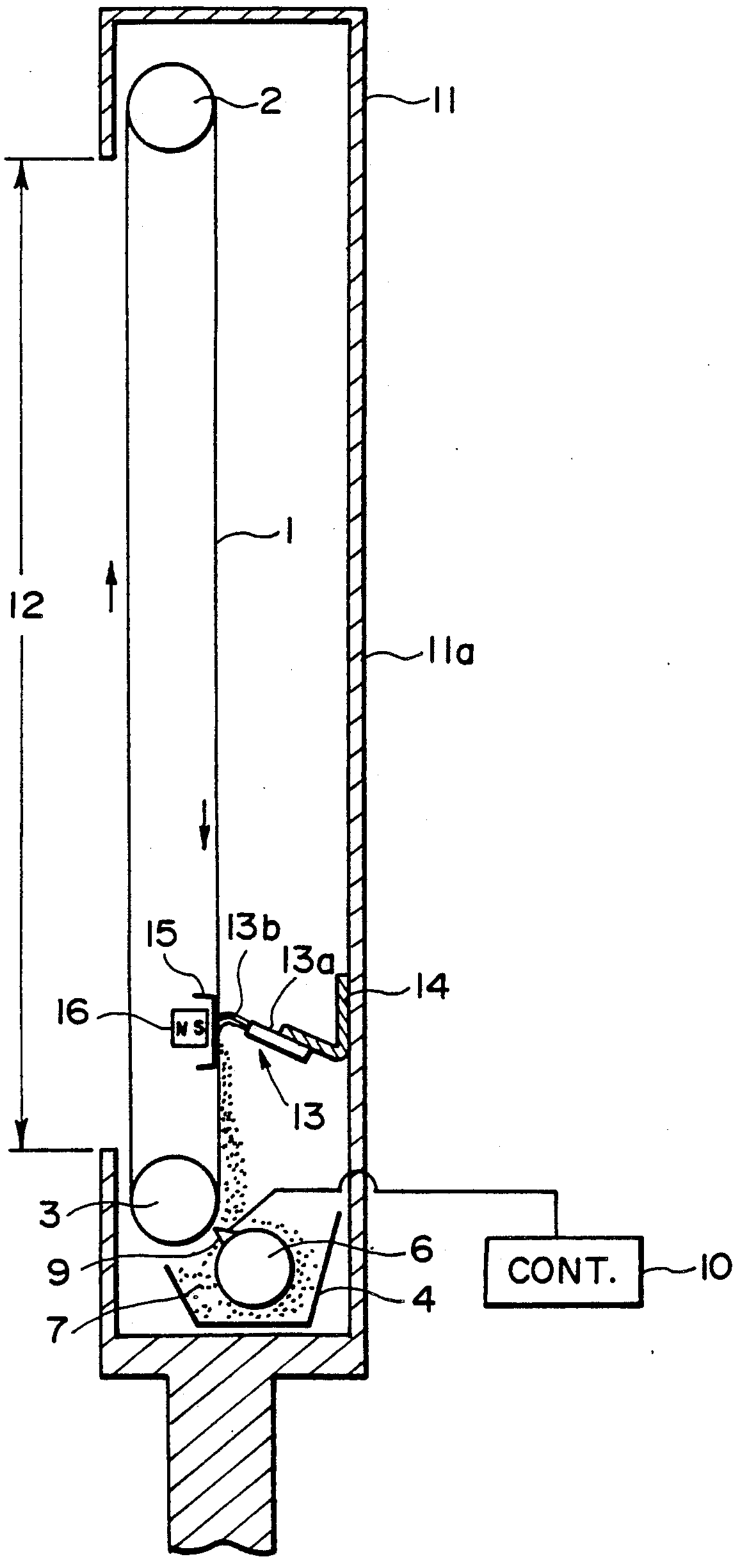
FIG. 1 is a longitudinal sectional view illustrating a general arrangement of the apparatus according to a first embodiment of the present invention.
Figure 8:
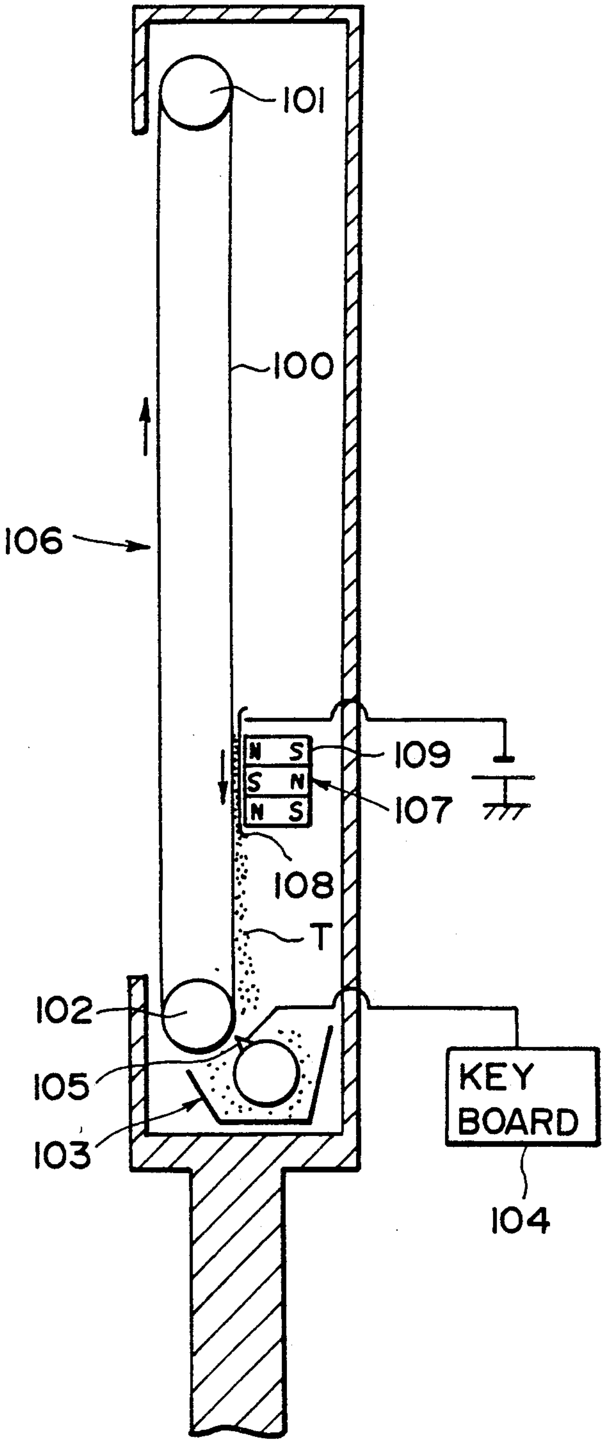
F I G. 8 PRIOR ART
FIG. 8 is a longitudinal sectional view of an image recording apparatus according to prior art.
Figure 9:
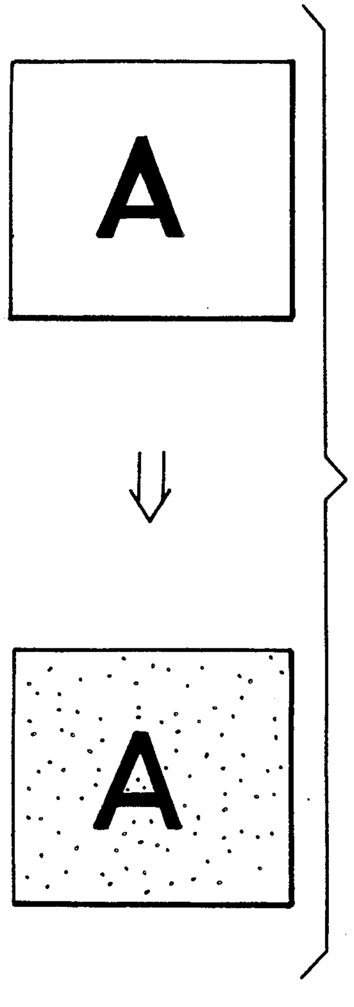
F I G. 9 PRIOR ART
FIG. 9 illustrates examples of images formed by the apparatus of FIG. 8.
Figure 2:
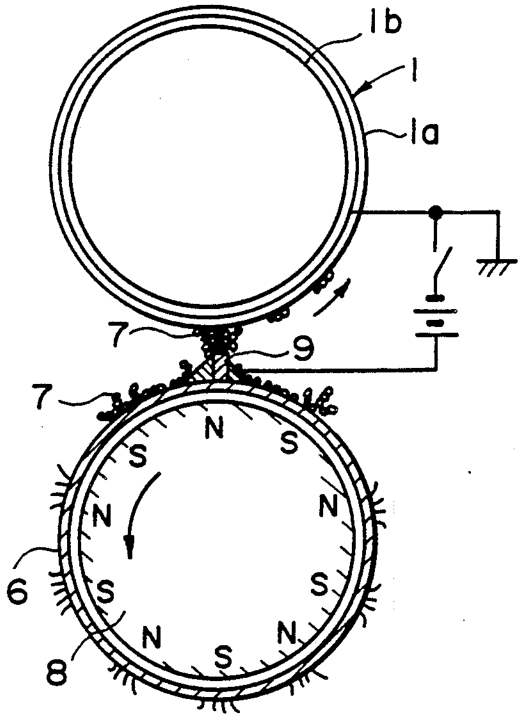
FIG. 2 is a sectional view illustrating the image formation principle in the first embodiment.

Referring to FIG. 1, there is shown an image recording apparatus according to a first embodiment of the present invention. The recording apparatus comprises a recording medium 1 in the form of a web which is supported or stretched between a pair of rollers 2 and 3 disposed at a top and a bottom of the apparatus, and an image forming means 4 for forming an image on the recording medium 1 at a position opposed to the roller 3. As for the image forming means 4, the means disclosed in Japanese Pat. Application No. 46707/1976 mentioned above is usable. More particularly, as shown in FIG. 2, conductive and magnetic toner 7 is supplied to the outer periphery of a non-magnetic cylinder 6 by a magnetic field provided by a rotational magnet 8. During this, a voltage is applied in accordance with image information by the record controlling section 10 to recording electrodes 9 disposed in a high density on the non-magnetic cylinder 6 along the axis thereof, so that a voltage is applied to the conductive layer 1*b* of the recording medium 1, by which the toner is deposited on the insulative layer 1*a* of the recording medium 1 in accordance with the image information.

The image formed on the recording medium 1 is displayed at the display station 12 having an optical opening formed in the front side of the main body 11 of the apparatus constituted by the casing. At the backside of the recording medium 1, a cleaning member 13 for erasing the image having been displayed on the recording medium 1 is fixed to a back plate 11*a* of the main body 11 through a mounting member 14. The cleaning member 13 is constituted by a supporting member 13*a* and a brush 13*b* of soft and conductive material. The cleaning means 13 is positioned and supported by the mounting member 14 such that the brush 13*b* rubs, contacts to or brushes the recording medium 1 at a proper angle and a proper distance. A non-magnetic member 15 and a magnet 16 are disposed for supporting the recording medium 1 at a position across the recording medium from the cleaning member 13. The magnet 16 is to prevent the toner 7 when the image is erased, and it also has a function to enhance the passage of the toner 7 removed by and contained in the brush 13*b* to increase the collecting efficient to the image forming means 4.

Figure 3:
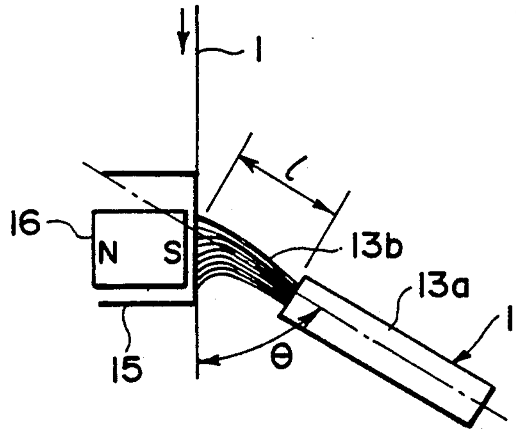
FIG. 3 is an enlarged sectional view illustrating the positional relationship between the cleaning member and the recording medium or the like in the same embodiment.

FIG. 3 shows the positional relations between the cleaning member 13 and the non-magnetic member 15 and between the cleaning member 13 and the magnet 16. The brush 13*b* of the cleaning member 13 is properly flexed so that it is contacted to the recording medium 1 at substantially the same level as the non-magnetic member 15 and the magnet 16, by which the magnetic toner 7 is efficiently removed from the recording medium 1. The brush 13*b* of the cleaning member 13 is made of conductive carbon fibers having the specific resistance of $10^2-10^{-4}$ ohm.cm. The height of the brush is approximately 8 mm, and the diameter of each of the hairs 13*b* of the brush is 1-10 microns The density is 500-5000 hairs/1 $mm^2$. The cleaning member 13 described above is set such that the distance 1 between the recording medium 1 and the root of the hairs 13*b* is 5-8 mm, and that a rubbing angle $\theta$ of the cleaning member 13 relative to the recording medium 1 is 45-90 degrees, preferably 60-80 degrees. The magnetic flux density provided by the magnet 16 is 500-900 Gauss right above it.

In operation, the toner image displayed at the display station 12 is moved in the direction indicated by an arrow together with the recording medium 1. When it reaches the position of the cleaning member 13, the toner image is rubbed by the brush 13*b*, and the magnetic toner 7 is attracted to the free ends of the brush 13*b* by the magnet 16. When a certain amount of the toner 7 is accumulated adjacent the leading edges, it falls and is collected by the image forming station 4 for repetitive use. Since the brush 13*b* is made by binding carbon fibers, it is so soft that the surface of the recording medium 1 is not damaged even when it rubs a whitish area of the recording medium 1. Also, since the brush 13*b* is electrically conductive, it is effective to remove the electric charge which possibly remains when the resistance of the recording medium 1 is high and is electrically charged during the image forming step. Therefore, the surface potential of the recording medium can be made uniform, and the next image recording operation can be performed under good conditions.

Figure 4:
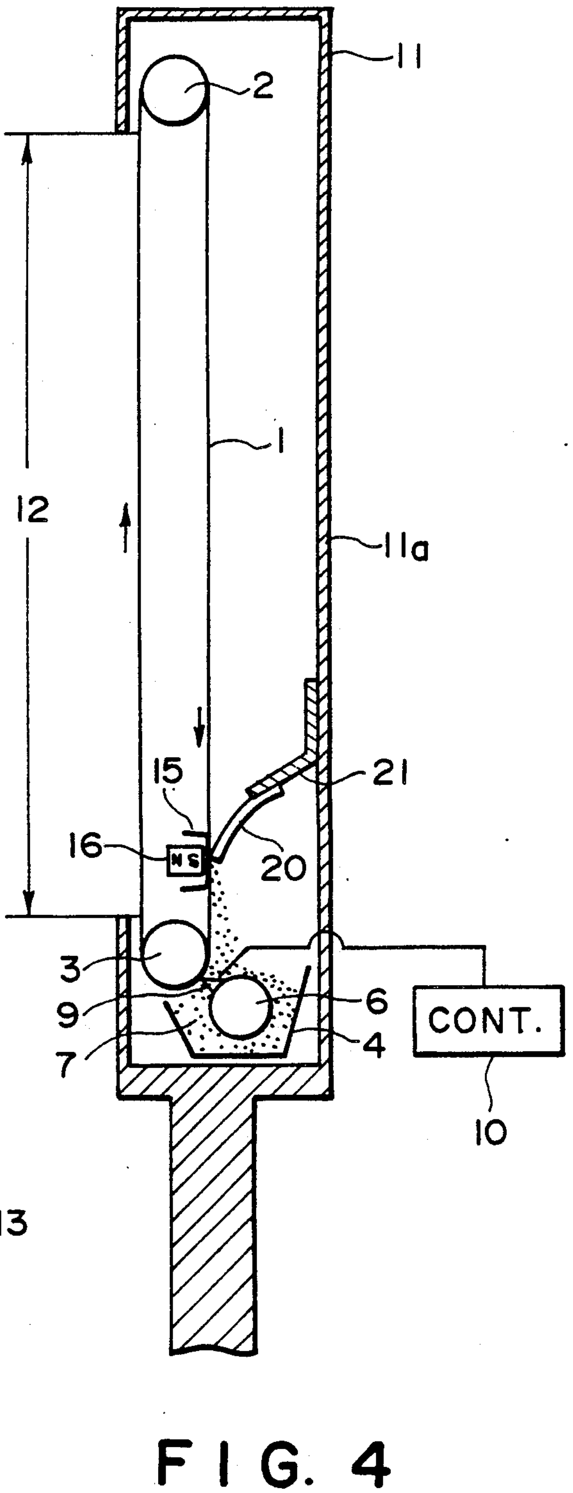
FIG. 4 is a longitudinal sectional view illustrating an arrangement of an apparatus according to a second embodiment of the present invention.

FIG. 4 illustrates an apparatus according to a second embodiment of the present invention. The structure of this embodiment is similar with the exception that the erasing means is made of a cleaning member 20 made of electrically conductive rubber. In this embodiment, the cleaning member 20 is mounted to the back plate 11*a* through a mounting member 21, so that it rubs the recording medium 1 at an appropriate angle. The conductive rubber constituting the cleaning member 20 has a volume resistivity of $10^1-10^3$ ohm.cm and a hardness of 35-60, preferably 40-50 degrees (JIS-A).

In place of the carbon fiber and conductive rubber used in the first and second embodiments soft synthetic resin plastic materials (polyethylene, polypropyrene), urethane rubber and silicone which is made electrically conductive compound material, is usable.

In the first and second embodiments, the cleaning member is mounted to the back plate through the mounting members, but the present invention is not limited to this specific structure. For example, the brush 13*b* and the cleaning member 20 may be directly grounded.

Figure 5:
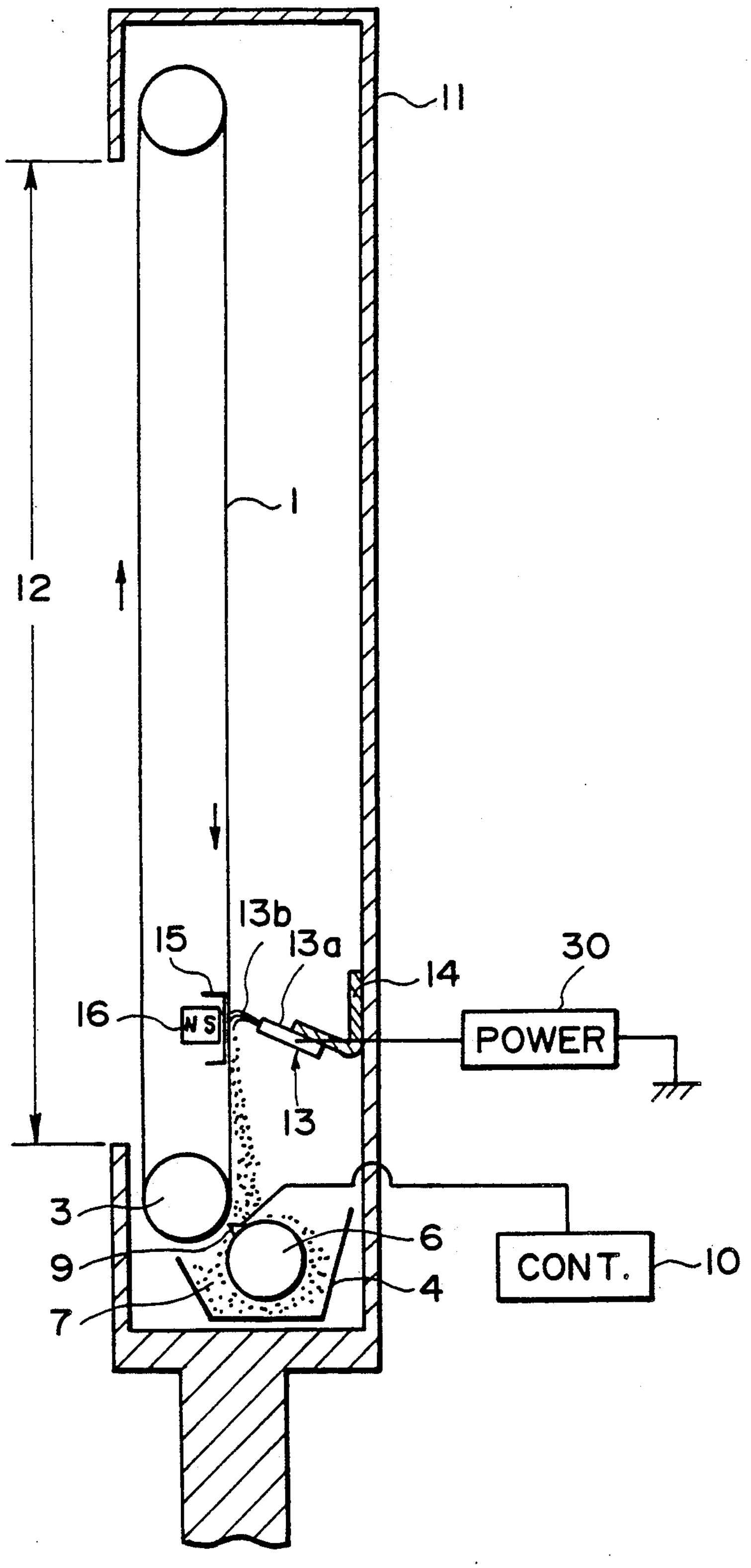
FIG. 5 is a longitudinal sectional view illustrating a general arrangement of an apparatus according to a further embodiment of the present invention.
Figure 6:
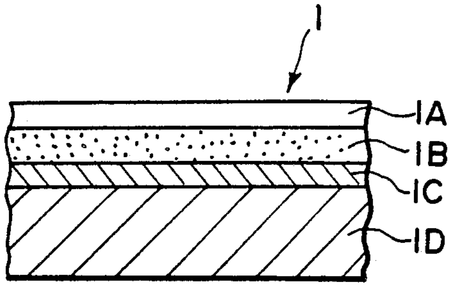
FIG. 6 is an enlarged sectional view illustrating the structure of the recording medium in the same embodiment.
Figure 7:
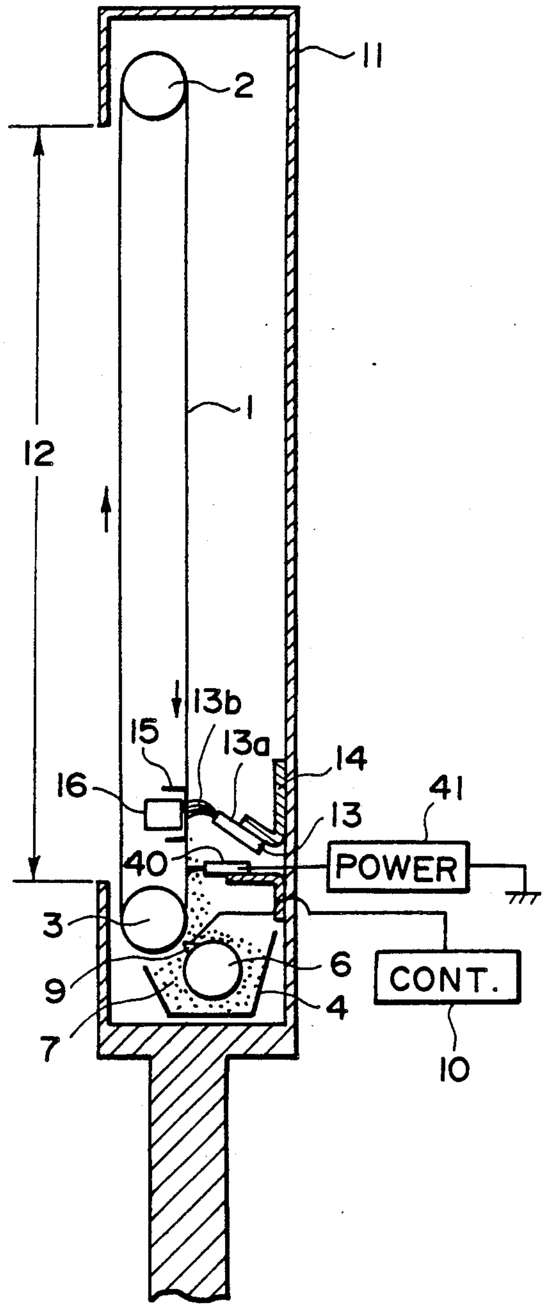
FIG. 7 is a longitudinal sectional view illustrating a general arrangement of an apparatus according to a further embodiment.

Referring to FIGS. 5–7, there is shown further embodiments which are similar to the FIG. 1 embodiment with the exception that each of the apparatuses of these embodiments are provided with a power source 30 for applying a predetermined voltage to the cleaning member 13, and therefore, the detailed description of the common parts are omitted for simplicity.

FIG. 6 shows an enlarged sectional view of a recording medium used in the apparatuses of these embodiments and usable in the embodiment of FIG. 1. The recording medium 1 comprises a surface layer 1A made of transparent material containing as a major component phenol resin or urethane resin material, and a white layer 1B under the surface layer 1A'. The white layer 1B contains white inorganic material such as aluminum oxide ($Al_2O_3$), and binder material such as acryl resin or plastic resin. A bottom substrate layer 1D is made of plastic resin such as polyethyleneterephthalate, polyethylene and polypropylene. A conductive layer 1C between the bottom layer 1D and the white layer 1B is made of aluminum or I.T.O. (Indium-Tin-Oxide) evaporated on the surface of the bottom layer 1D to provide electric conductivity.

In order to erase the toner image displays at the display station 12 after being formed by the image forming means 4 in this embodiment, the recording medium 1 is moved in the direction indicated by an arrow, by the conductive brush 13*b* of the cleaning member 13 which scrapes the toner 7 off the recording medium 1. In the erasing action, if the surface layer 1A of the recording medium 1 is made of butyral resin, it is possible that a positive or negative electric charge is produced on the surface layer 1A by the rubbing action between the toner 7 and the surface layer 1A when the surface layer 1A passes by the recording electrode 9 for the image formation, or by the rubbing action between the toner 7 or the brush 13*b* and the surface layer 1A when the surface layer 1A passes by the cleaning member 13 for the image erasure. When the next image formation is performed using the recording medium 1 thus charged to positive or negative polarity, the toner 7 is electrostatically deposited on the non-image area of the surface layer 1A of the recording medium 1, thus deteriorating the image quality.

By using an electrically conductive material for the hairs 13*b* of the cleaning member 13*b* as in the FIG. 1 embodiment, the electric charge on the surface layer 1A can be removed to a certain extent. However, when a high resistance material as a layer other than the conductive layer 1C, and when the image recording operation is performed under a low humidity condition, the recording medium is not sufficiently discharged by the discharging function by the brush 13*b* . solely On the other hand, when the surface layer 1A is made of phenol resin, positive electric charge is produced on the surface layer 1A at non-print areas after the above-described recording, displaying and cleaning steps are carried out, so that the magnetic toner 7 is electrostatically attracted by the charge with the result that the toner 7 is deposited on the background area of the recording medium 1

In consideration of the above, this embodiment employs a discharging power source 30 for sufficiently discharging the electric charge produced on the recording medium 1. The discharging power source 30 applies to the cleaning member 13 a voltage having a polarity opposite to that of the electric charge on the recording medium 1. An amount of charge of the recording medium surface layer 1A is detected by an unshown but known detecting means, in response to which a proper voltage is applied. More particularly, when the charge produced has negative polarity, a positive voltage is applied from the power source 30 through the cleaning member 13, and if it is positive, a negative voltage is applied. The voltage applied is $-30$–$+30$ V, preferably $-7$–$+7$ V.

As described in the foregoing, according to this embodiment, the image erasure is always sufficient with stability without damage to the surface of the recording medium 1, similarly to the embodiment of FIG. 1, and in addition, the image erasure is possible with stability irrespective of the ambience and the material of the recording medium 1, so that the recording medium 1 is prevented from contamination, and the high quality image can be recorded and displayed.

Since the voltage applied by the source 30 is $-30$–$+30$ V, preferably $-7$–$+7$ V, and the current flowing between the recording medium 1 and the cleaning member 13 is at most several tens micro-ampere, it is not necessary to prepare a large power source. In this sense, the significant toner deposition prevention can be accomplished without an increase of the size and cost of the apparatus.

FIG. 7 shows a further embodiment, wherein the same reference numerals are assigned as in FIG. 1 to the corresponding elements. In this embodiment, below the cleaning member 13, an additional cleaning member 40 which is similar to the cleaning member 13 is provided, and a power source 41 is connected to the cleaning member 40 to apply a voltage thereto to discharge the surface of the recording medium 1. It should be noted that no power source is connected to the cleaning member 13 in the embodiment having this structure; the two cleaning members 13 and 40 have the functions of rubbing the recording medium 1 and discharging it, respectively, and therefore, the image erasing functions is enhanced. If desired, the cleaning means 13 may be supplied with a voltage, similar to the cleaning member 40. The other structures are the same as the embodiments described hereinbefore, and therefore, the description thereof are omitted for simplicity.

The voltage applied to the cleaning member 13 or ultimately to the recording material may be an AC voltage, or an AC voltage superposed with a DC voltage of the polarity opposite to that of the charge on the recording medium As described in the foregoing, according to the present invention, the erasing means for rubbing the magnetic developer toner image formed on the recording medium to erase it is made of soft and electrically conductive material, whereby the image can be erased at all times with certainty without damage to the recording medium, and therefore, high quality image recording can be performed.

In addition to the above advantageous effects, by applying to the recording medium a voltage having a polarity opposite to that of the electric charge on the recording medium, the unnecessary charge on the recording medium surface can be completely discharged, and therefore, the deposition of the magnetic developer to the non-image area of the recording medium surface can be prevented. Therefore, even higher image quality can be achieved.

While the invention has been described with reference to the structures disclosed herein, it is not confined to the details set forth and this application is intended to cover such modifications or changes as may come within the purposes of the improvements or the scope of the following claims.

What is claimed is:

1. A cleaning device for removing toner from a recording medium after a toner image is formed on the recording medium by application of a voltage between a recording electrode and the recording medium with the toner which is electrically conductive and magnetic and is supplied from a toner container into the space between the recording electrode and the recording medium moving relative to the electrode, the improvement comprising:

a brush of soft and electrically conductive material for rubbing the removing toner from one side of said recording medium at a position where the recording medium carries the toner downwardly, said brush rubbing said recording medium along the same direction of movement of said recording medium, said brush being disposed above said toner container to permit the toner removed by said brush to fall and be received by said toner container;

a supporting member for supporting said brush adjacent the position where said brush rubs said recording medium; and magnetic means disposed at another side of said recording medium opposite said brush.

2. A cleaning device for removing toner from a recording medium after a toner image is formed on the recording medium by application of a voltage between a recording electrode and the recording medium with the toner which is electrically conductive and magnetic and supplied from a toner container into the space between said recording electrode and said recording medium moving relative to said electrode, the improvement comprising:

a brush of soft and electrically conductive material for rubbing and removing toner from one side of said recording medium at a position where said recording medium carries the toner downwardly, said brush rubbing said recording medium along the same direction of movement of said recording medium, said brush being disposed above said toner container to permit the toner removed by said brush to fall and be received by said toner container;

a supporting member for supporting said brush adjacent the position where said brush rubs said recording medium; and an electric circuit for providing a predetermined electrical potential to said brush.

3. A device according to claim 2, further comprising magnetic means disposed at another side of said recording medium opposite said brush.

4. A device according to claim 1, further comprising a discharging electrode disposed downstream of said brush with respect to the movement direction of said recording medium, for removing any electric charge from said recording medium, said discharging electrode being supplied with a bias voltage.

5. A device according to claim 1, wherein said recording medium is used for displaying a formed toner image.

6. An image forming apparatus wherein conductive and magnetic toner is deposited onto a recording medium to form a toner image, comprising:

a recording electrode opposed to said recording medium;

means for supplying the toner into the space between said electrode and said recording medium;

means for applying a voltage for recording between said electrode and said recording medium; and a cleaning device for removing the toner from said recording medium, said cleaning device comprising a rubbing member of soft and electrically conductive material and a supporting member disposed adjacent a position where said rubbing member disposed adjacent a position where said rubbing member rubs said recording medium, for supporting said rubbing member, wherein said rubbing member comprises a brush as the soft and electrically conductive material, said brush rubbing said recording medium along the same direction of movement of the recording medium.

7. An apparatus according to claim 6, wherein said rubbing member is of synthetic resin material having a hardness of 35–60 degrees.

8. An image forming apparatus for forming a toner image by depositing electrically conductive and magnetic toner to a recording medium, comprising:

a recording electrode opposed to said recording medium;

means for supplying the toner into a space between said electrode and said recording medium;

means for applying a voltage for the recording between said electrode and said recording medium;

means for removing the toner from one side of said recording medium, said removing means comprising a conductive brush and a supporting member for supporting the brush adjacent a position where the brush rubs the recording medium, said brush rubbing said recording medium along the same direction of movement of the recording medium; and a casing for accommodating said electrode, said supplying means, said voltage applying means, and said removing means and having an optical opening for displaying the toner image formed on said recording medium.

9. An apparatus according to claim 8, further comprising magnetic means disposed at another side of said recording medium opposite said brush.

10. An apparatus according to claim 8, wherein said brush is connected to an electric circuit for providing a predetermined electrical potential.

11. An apparatus according to claim 8, further comprising a discharging electrode disposed downstream of said brush with respect to the movement direction of said recording medium, for removing any electric charge from said recording medium, said discharging means being supplied with a bias voltage.

* * * * *

UNITED STATES PATENT AND TRADEMARK OFFICE
CERTIFICATE OF CORRECTION

PATENT NO. : 4,989,021

DATED : January 29, 1991

INVENTOR(S) : Toshihiko Ochiai, et al.

It is certified that error appears in the above-identified patent and that said Letters Patent is hereby corrected as shown below:

COLUMN 5:

Line 54, "discharged" should read --discharged solely--.

Line 55, "brush 13b . solely" should read --brush 13b.--.

COLUMN 8:

Line 20, "disposed adjacent a position where said rubbing" should be deleted.

Line 21, "member" should be deleted.

Signed and Sealed this

First Day of September, 1992

Attest:

DOUGLAS B. COMER

*Attesting Officer*

*Acting Commissioner of Patents and Trademarks*